United States Patent [19]

Bohman et al.

[11] 3,838,230

[45] Sept. 24, 1974

[54] COAXIAL CABLE TRANSMISSION LINE

[75] Inventors: Knut Goran Bohman, Tyreso; Andre Dudnik, Bandhagen, both of Sweden

[73] Assignee: Telefon aktiebolaget L. M. Ericsson, Stockholm, Sweden

[22] Filed: Sept. 13, 1972

[21] Appl. No.: 288,875

[30] Foreign Application Priority Data

Sept. 20, 1971 Sweden ............................ 11890/71

[52] U.S. Cl. ............................................ 179/170 A
[51] Int. Cl. ............................................ H04b 3/58
[58] Field of Search...... 179/170 A, 170 R, 170 HF; 333/16

[56] References Cited

UNITED STATES PATENTS

| | | | |
|---|---|---|---|
| 2,758,281 | 8/1956 | Carleson | 179/170 R |
| 2,777,994 | 1/1957 | Hurault | 333/16 |
| 2,782,258 | 2/1957 | Stalemark et al. | 333/16 |
| 3,414,687 | 12/1968 | Hermes et al. | 179/170 A |

*Primary Examiner*—Kathleen H. Claffy
*Assistant Examiner*—Thomas L. Kundert
*Attorney, Agent, or Firm*—Hane, Baxley & Spiecens

[57] ABSTRACT

A coaxial cable transmission line for comparatively high frequencies comprises coaxial cables and intermediate repeaters. Each repeater consists of two separate amplifier units connected in cascade, one having a linear frequency characteristic with a positive slope by which the linearity coefficient is adjustable. The other unit has an amplification as a function of the frequency consisting of two terms one of which is a constant and the other is increasing proportionally to the square root of the frequency. The value of the constant of proportionality is automatically adjustable by means of a pilot signal to such a value that nominal signal level is achieved at the output of the repeater in case of attenuation variations of the cable connected to the input.

1 Claim, 5 Drawing Figures

COAXIAL CABLE TRANSMISSION LINE

The present invention concerns a coaxial cable transmission line designed for comparatively high frequencies, comprising a number of coaxial cables and intermediate repeaters.

In telephony one utilizes today carrier frequency transmission systems with carrier frequencies up to 12 MHz using coaxial cable as the transmission medium. However, the technical and sometimes the economic advantages of carrier frequencies that are considerably higher is unquestionable. Accordingly, in the near future a change to 60 MHz first, and then to even higher frequencies is expected. It is sometimes convenient to make use of existing cable networks designed for frequencies up to 12 MHz together with cables specially designed for the higher frequencies. However such combinations can cause certain problems.

A theoretically derived expression for the attenuation $\alpha$ of a coaxial cable is $$\alpha (f) = a_0 + a_1 \cdot \sqrt{f} + a_2 \cdot f \text{ dB/km}$$

where the coefficients $a_0$, $a_1$ and $a_2$ are cable-parameters and the variable f stands for frequency. Approximate values of these coefficients are $$a_0 = 0.015 \; a_1 = 2.3 \; a_2 = 0.002$$

The temperature dependence of the coefficients $a_0$ and $a_2$ is negligible while the coefficient $a_1$ increases about 2°°/0/°C, two parts per thousand per degree Centrigrade. The coefficient $a_2$ varies depending on the type of cable by a factor 10 or so (0.001–0.01). Furthermore the coefficient $a_2$ varies with different cables of the same type due to unsufficient control of certain parameters in the manufacturing process. Evidently the contribution of the linear term $a_2 \cdot f$ to the total attenuation increases absolutely as well as relatively as the frequency increases and this fact is accentuated with increasing value of the coefficient $a_2$. For frequencies up to 12 MHz, however, the contribution of the linear term $a_2 \cdot f$ to the total attenuation is so negligible that up until now it has not been necessary to take this term into consideration while compensating for a signal-level deviation caused by a temperature change of the cable. However, as mentioned above, the temperature dependence of the coefficients $a_0$ and $a_2$ is negligible so that a correct compensation of a level deviation caused by the temperature ought to affect the coefficient $a_1$ only. Due to said great difference between the coefficient $a_1$ and the coefficients $a_0$ and $a_2$ it has up till now been possible to neglect the error which arises when the compensation of a signal-level deviation caused by a temperature change affects all the coefficients i.e., a temperature change of the cable has been considered to affect the transmission properties of the cable in the same way as a change of the length of the cable.

When changing to 60 MHz systems, and possibly to systems with even higher carrier frequencies, the linear term $a_2 \cdot f$ will have increased significance. By the compensation of a signal-level deviation caused by a change of the temperature of the cable one will have a remaining regulating error irrespectively of whether all the cables of a section of line have the same value of the parameter $a_2$ or not if the regulation or compensation is made in a conventional way i.e., the compensation affects the three coefficients in the same way.

This regulating error is difficult to compensate because it is difficult to survey when the signal has passed a number of intermediate repeaters and the difficulty of the problem increases if the coefficient $a_2$ is changing along the section of line.

The present invention concerns a coaxial cable transmission line, designed for comparatively high frequencies, comprising a number of different types of coaxial cable where the shift between the different types of cables is taking place in the intermediate repeaters in such a way that simultaneously a better compensation of signal-level deviations caused by a temperature change is achieved. The invention is characterized as is indicated in the characterizing part of the appended claim.

The invention will be described more in detail below with reference to the following drawing, where FIG. 1 shows a coaxial cable with a connected intermediate repeater.

Figure 1:
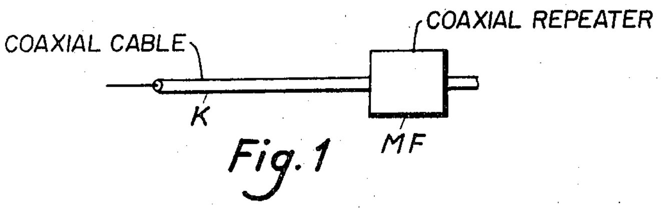
FIG. 1 shows a basic element in the coaxial cable transmission line comprising a coaxial cable K characterized by a set of parameters and an intermediate repeater MF whose task is to reset the signal-level to a nominal value at the input of the subsequent cable.
Figures 2, 3:
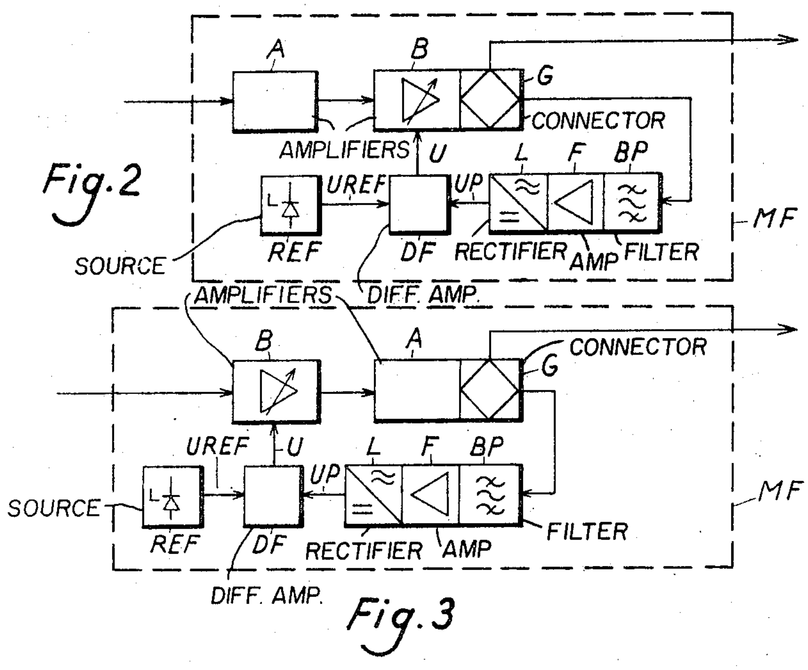
FIGS. 2 and 3 show block diagrams of two embodiments of the intermediate repeaters according to the invention.
Figure 4:
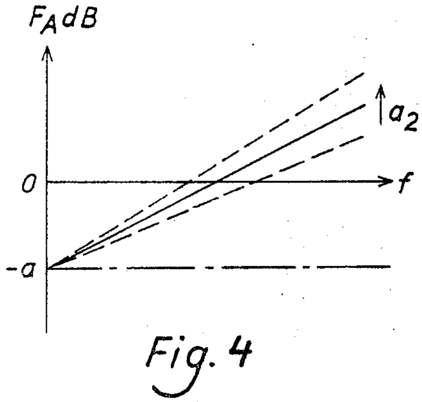
FIGS. 4 and 5 show examples of amplification characteristics of the two amplifiers connected in cascade.

FIG. 2 shows a block diagram of an intermediate repeater MF the amplification of which is divided up between two units A and B connected in cascade. The unit A is arranged to compensate for the linear part $a_2 \cdot f$ of the attenuation $\alpha$ of the cable connected to the input and the main task of the unit B is to compensate for the temperature depending part $a_1 \cdot \sqrt{f}$ of said attenuation. By a simple adjustment of the value of a component comprised in the unit A for example in order to change the rate of feed-back in the amplifier, if the unit A is an amplifier, the slope of the amplification characteristic can be adjusted so as to correspond to the linear term $a_2 \cdot f$ with the value of the parameter $a_2$ applicable to the connected cable (cf. FIG. 4). This adjustment takes place at the installation of the intermediate repeater and the adjusted value corresponds for example to the mean value of the parameter $a_2$ applicable to the type of cable.

Figure 5:
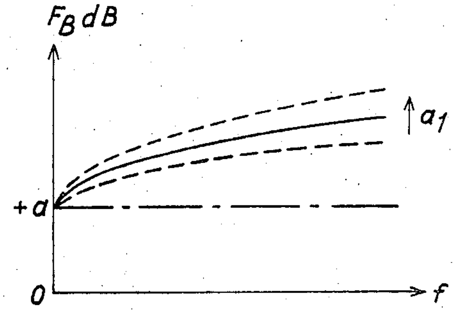

The amplification of the amplifier B as a function of the frequency consists of two terms of which the first increases proportionally to the square root of the frequency (cf. FIG. 5) and the value of the constant of proportionality can be varied continuously within a certain given range around a nominal value and the second term can be zero or may have another constant value depending on the properties of the unit A. When the unit A is designed in such a way that within its frequency range it has an attenuation according to the characteristic below the zero level in FIG. 4, there must be added a constant amplification contribution to make the compensation of the linear part of the attenuation of the cable complete. This addition may be carried out in the unit A or the unit B or in a separate unit in connection with the units A and B.

The amplification of the amplifier B corresponding to said first term is controlled in a conventional way i.e., via a branch connection G at the output of the amplifier B and a pilot-frequency receiver BP, F, L consisting of a band-pass filter BP for filtering of a special pilot frequency, an amplifier F and a rectifier L. The pilot-frequency receiver generates a voltage UP which is a measure of the signal level at the output of the intermediate repeater MF. Further this voltage is compared with a fixed reference-voltage UREF from the output of a reference unit REF which reference-voltage corresponds to nominal attenuation. The comparison is carried out in a difference amplifier DF which, upon a detected difference between the voltages UP and UREF, adjusts a regulator for instance a thermistor by means of its output voltage U. Such a regulator is contained in a variable network in the amplifier B which controls the amplification. This regulation is carried out in such a way that said voltage difference is decreased so that the nominal signal level is reset at the output of the intermediate repeater.

FIG. 3 shows an example of another embodiment of the intermediate repeater MF in which the sequence of the two units A and B is changed so that the unit A is contained in the control loop too. The desired effect that the linear contribution $a_2 \cdot f$ to the total attenuation $\alpha$, which contribution is not dependent on the temperature, should not be affected by the compensation of signal level deviations caused by the temperature is however achieved in this case too.

By designing the control circuit with a suitable range of control this circuit can also compensate for variations of the parameter $a_1$ between different cables which are not caused by the temperature.

The parameter $a_0$, which is frequency independent, is growing more and more unimportant as the frequency increases and the error introduced when neglecting to compensate for this part of the attenuation is insignificant.

Thus the intermediate repeaters are independent of the type of cable which is connected to the input so far as there is just needed an easy adjustment of a component value in the unit A. The shift between different cables is thus realized in a simple way and the compensation of temperature dependent errors is improved as the linear term of the attenuation is not effected by the compensation.

We claim:

1. Coaxial cable transmission line for comparatively high frequencies comprising a number of coaxial cables and intermediate repeaters and one pilot-frequency signal source, said repeaters comprising two units connected in cascade, one of said units having a linear frequency characteristic with a positive slope, the linearity coefficient of said linear frequency characteristic being a preadjustable value related to the type of coaxial cable connected to the repeater, said value remaining constant during the operation of the repeaters irrespective of changes in a given environmental parameter, and the other of said units having an amplification as a function of the frequency consisting of two terms one of which is a constant and the other is increasing proportionally to the square root of the frequency, and means responsive to the pilot-frequency signal for automatically adjusting the value of the constant of proportionality to such a value that a nominal signal level is achieved at the output of a repeater in case of attenuation variations of the cable connected to said repeater because of changes in said given environmental parameter.

* * * * *